US011339234B2

(12) United States Patent
Ye et al.

(10) Patent No.: US 11,339,234 B2
(45) Date of Patent: May 24, 2022

(54) PROPYLENE RANDOM COPOLYMER

(71) Applicant: LG Chem, Ltd., Seoul (KR)

(72) Inventors: Jihwa Ye, Daejeon (KR); Taejin Kim, Daejeon (KR); Kyung Seop Noh, Daejeon (KR); Heekwang Park, Daejeon (KR); Seong Min Chae, Daejeon (KR); Daeyeon Lee, Daejeon (KR)

(73) Assignee: LG Chem, Ltd.

( * ) Notice: Subject to any disclaimer, the term of this patent is extended or adjusted under 35 U.S.C. 154(b) by 65 days.

(21) Appl. No.: 16/765,250

(22) PCT Filed: Oct. 30, 2019

(86) PCT No.: PCT/KR2019/014479
§ 371 (c)(1),
(2) Date: May 19, 2020

(87) PCT Pub. No.: WO2020/091420
PCT Pub. Date: May 7, 2020

(65) Prior Publication Data
US 2020/0354492 A1    Nov. 12, 2020

(30) Foreign Application Priority Data
Nov. 2, 2018   (KR) ........................ 10-2018-0133860

(51) Int. Cl.
C08F 210/06   (2006.01)
C08F 4/6592   (2006.01)
C07F 17/00    (2006.01)

(52) U.S. Cl.
CPC ............ *C08F 210/06* (2013.01); *C07F 17/00* (2013.01); *C08F 2420/01* (2013.01); *C08F 2800/20* (2013.01)

(58) Field of Classification Search
CPC ..... C08F 210/06; C08F 4/65927; C07F 17/00
See application file for complete search history.

(56) References Cited

U.S. PATENT DOCUMENTS

| 5,597,881 A | 1/1997 | Winter et al. |
| 6,214,447 B1 | 4/2001 | Nakagawa et al. |
| 6,657,033 B1 | 12/2003 | Sartori et al. |
| 2001/0012562 A1 | 8/2001 | Nakagawa et al. |
| 2002/0182426 A1 | 12/2002 | Tanaka et al. |
| 2003/0092818 A1 | 5/2003 | Matsuda et al. |
| 2006/0276607 A1 | 12/2006 | Ikenaga et al. |
| 2009/0017710 A1 | 1/2009 | Bugada et al. |
| 2011/0196103 A1 | 8/2011 | Kawahara et al. |
| 2015/0259442 A1 | 9/2015 | Kallio et al. |
| 2016/0115282 A1 | 4/2016 | Burmaster et al. |
| 2019/0106516 A1 | 4/2019 | Park et al. |

FOREIGN PATENT DOCUMENTS

| JP | H08238729 A | 9/1996 |
| JP | H10-338778 A | 12/1998 |
| JP | 2015193831 A | 11/2015 |
| KR | 20010052923 A | 6/2001 |
| KR | 20010103768 A | 11/2001 |
| KR | 100431575 B1 | 9/2004 |
| KR | 20050118208 A | 12/2005 |
| KR | 20080098637 A | 11/2008 |
| KR | 20150091308 A | 8/2015 |
| KR | 20160014557 A | 2/2016 |
| KR | 20180057469 A | 5/2018 |
| WO | 2017204830 A1 | 11/2017 |

OTHER PUBLICATIONS

Extended European Search Report including Written Opinion for Application No. 19879023.0. dated Feb. 25, 2021, pp. 1-9.
IDES.com/prospector, "RAMOFIN PPH300G4," Polyram Ram-On Industries—Polypropylene Homoploymer, Aug. 4, 2008, IDES—The Plastics Web; 2 pages.
International Search Report for PCT/KR2019/014479 dated Feb. 11, 2020; 4 pages.

*Primary Examiner* — Caixia Lu
(74) *Attorney, Agent, or Firm* — Lerner, David, Littenberg, Krumholz & Mentlik, LLP

(57) ABSTRACT

Provided is a propylene random copolymer having excellent processability. The propylene random copolymer according to the present invention may exhibit high stiffness and flexural modulus together with a low shrinkage ratio, thereby being usefully applied to articles for thin wall injection molding.

10 Claims, No Drawings

PROPYLENE RANDOM COPOLYMER

CROSS-REFERENCE TO RELATED APPLICATIONS

This application is a national phase entry under 35 U.S.C. § 371 of International Application No. PCT/KR2019/014479 filed Oct. 30, 2019, which claims priority from Korean Patent Application No. 10-2018-0133860 filed Nov. 2, 2018, all of which are incorporated herein by reference.

TECHNICAL FIELD

The present invention relates to a propylene random copolymer having excellent shrinkage property and mechanical property.

BACKGROUND ART

Polypropylene has been used as a general-purpose resin in various fields due to its low specific gravity, high heat resistance, and excellent processability and chemical resistance.

Recently, a method of random-copolymerizing propylene with ethylene or butene has been studied for the production of injection-molded articles requiring transparency. However, there has been a problem in that crystallinity of the random-copolymerized polypropylene decreases with increasing content of the comonomer butene in the polymer, as compared with the existing homopolypropylene, and as a result, flexural modulus, which is a property related to stiffness, is lowered.

Meanwhile, a catalyst for polypropylene polymerization may be largely divided into a Ziegler-Natta catalyst and a metallocene catalyst. Since the Ziegler-Natta catalyst is a multi-active site catalyst in which a plurality of active sites are mixed, it is characterized in that the resulting polymer has a broad molecular weight distribution, and there is a limit in securing desired physical properties due to non-uniform composition distribution of the comonomer. In particular, when random copolymerization with butene is performed to ensure transparency in the presence of the Ziegler-Natta catalyst, the flexural modulus is greatly reduced due to the decrease in crystal property.

In contrast, the metallocene catalyst includes a combination of a main catalyst having a transition metal compound as a main component and a cocatalyst of an organometallic compound having aluminum as a main component. Such a catalyst is a single-site catalyst which is a homogeneous complex catalyst, and offers a polymer having a narrow molecular weight distribution and a uniform composition distribution of comonomers according to the single site characteristics. The stereoregularity, copolymerizing properties, molecular weight, crystallinity and the like of the resulting polymer may be controlled by changing a ligand structure of the catalyst and polymerization conditions.

Accordingly, there is a demand for the development of a method of preparing polypropylene using the metallocene catalyst, in which the polypropylene has stiffness and flexural modulus, and thus is particularly useful for injection molding.

DISCLOSURE

Technical Problem

To solve the problems of the prior art, the present invention provides a propylene random copolymer having a low shrinkage ratio and high flexural modulus and being suitable for thin wall injection molding.

Technical Solution

To achieve the above object, the present invention provides a propylene random copolymer satisfying the following conditions:
1) a molecular weight distribution (Mw/Mn, PDI) of 2.4 or less;
2) a comonomer content of 10% by weight or less;
3) a shrinkage ratio of 1.0% or less, as measured in accordance with ASTM D955 method;
4) flexural modulus of 13,000 kg/cm$^2$ or more, as measured in accordance with ASTM D790 method; and
5) tensile strength at yield of 290 kg/cm$^2$ or more, as measured in accordance with ASTM D638 method.

Effect of the Invention

A propylene random copolymer according to the present invention may exhibit high stiffness and flexural modulus together with a low shrinkage ratio, thereby being usefully applied to the production of articles for thin wall injection molding.

DETAILED DESCRIPTION OF THE EMBODIMENTS

In the present invention, the terms "first", "second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics, numbers, steps, components, or combinations thereof, and do not exclude the existence or the possibility of addition of one or more different characteristics, numbers, steps, components, or combinations thereof beforehand.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the present invention.

Hereinafter, a propylene random copolymer of the present invention will be described in detail.

A propylene random copolymer according to one embodiment of the present invention is characterized by satisfying the following conditions: 1) a molecular weight distribution (Mw/Mn, PDI) of 2.4 or less; 2) a comonomer content of 10% by weight or less; 3) a shrinkage ratio of 1.0% or less, as measured in accordance with ASTM D955 method; 4) flexural modulus of 13,000 kg/cm$^2$ or more, as measured in accordance with ASTM D790 method; and 5) tensile strength at yield of 290 kg/cm$^2$ or more, as measured in accordance with ASTM D638 method.

Propylene (co)polymers prepared by a Ziegler-Natta catalyst exhibit high shrinkage properties, as compared with other polyolefin resins. As a molding shrinkage ratio after injection is higher, it is more disadvantageous in application to injection molded articles, and thus it is necessary to improve shrinkage property.

Accordingly, the present invention may provide a propylene random copolymer having excellent mechanical properties such as flexural modulus, tensile strength at yield, impact strength, etc. while having a low shrinkage ratio.

Specifically, the propylene random copolymer according to one embodiment of the present invention has a molecular weight distribution (Mw/Mn, PDI) of 2.4 or less. Since the propylene random copolymer has such a narrow molecular weight distribution, stiffness may be increased to exhibit excellent mechanical properties during production of various molded articles. More specifically, the propylene random copolymer may have a molecular weight distribution of 2.4 or less, or 2.3 or less, or 2.2 or less, or 2.1 or less and 1.5 or more, or 2.0 or more.

In the present invention, the molecular weight distribution was determined by measuring a weight average molecular weight (Mw) and a number average molecular weight (Mn) of the propylene random copolymer using gel permeation chromatography (GPC), respectively and then calculating a ratio (Mw/Mn) of the weight average molecular weight to the number average molecular weight as the molecular weight distribution.

Specifically, a copolymer sample was tested using Waters PL-GPC220 instrument with PLgel MIX-B column having a length of 300 mm (Polymer Laboratories). A test temperature was 160° C., 1,2,4-trichlorobenzene was used as a solvent, and a flow rate was 1 mL/min. The sample was prepared at a concentration of 10 mg/10 mL, and then 200 μL thereof was fed. A calibration curve obtained with polystyrene standards was used to determine the values of Mw and Mn. 9 kinds of polystyrene standards having a molecular weight of 2,000/10,000/30,000/70,000/200,000/700,000/2,000,000/4,000,000/10,000,000 were used.

Further, the propylene random copolymer according to one embodiment of the present invention includes a comonomer in an amount of 10% by weight or less with respect to the total weight of the copolymer.

When propylene random copolymers are prepared using existing comonomers, heterogeneous comonomers enter between the main chains to deform a lamellar structure of the resin, leading to a problem of deterioration in strength. Therefore, in the present invention, the comonomer is included in an amount of 10% by weight or less, and thus a narrow molecular weight distribution may be achieved during random polymerization at a high conversion ratio, and improved strength properties may be obtained together with the excellent shrinkage ratio.

Considering that the effect of improving strength and shrinkage properties is remarkable by controlling the comonomer content, the comonomer content in the propylene random copolymer may be 0.5% by weight or more, or 1% by weight or more and 10% by weight or less, or 8% by weight or less, or 5% by weight or less, or 4% by weight or less.

Further, the comonomer may be ethylene or 1-butene.

Meanwhile, in the present invention, the comonomer content in the propylene random copolymer may be determined according to American Society for Testing and Materials, ASTM D 5576 by fixing a film or a film-shaped specimen of the propylene random copolymer to a magnetic holder of FT-IR instrument, measuring a height of 4800~3500 $cm^{-1}$ peak reflecting a thickness of the specimen and an area of 790~660 $cm^{-1}$ peak indicating the 1-butene component from IR absorption spectrum, and then substituting the measured values into Calibration Equation obtained by plotting a value obtained by dividing an area of 790~660 $cm^{-1}$ peak by a height of 4800~3500 $cm^{-1}$ peak of a standard sample. Further, the ethylene content may be determined by measuring an area of 710~760 $cm^{-1}$ peak indicating the ethylene component.

As described, the propylene random copolymer according to one embodiment of the present invention may have a narrow molecular weight distribution, thereby exhibiting high tensile strength at yield and flexural modulus, together with a low shrinkage ratio, when applied to injection-molded articles.

Further, the propylene random copolymer according to one embodiment of the present invention may have a shrinkage ratio of 1.0% or less, as measured in accordance with ASTM D955 method. More specifically, the propylene random copolymer may have a shrinkage ratio of 1.0% or less, or 0.9% or less, or 0.8% or less and 0.1% or more, or 0.2% or more, or 0.3% or more.

The shrinkage ratio may be determined according to ASTM D955 by measuring a length of a mold cavity (12.7*127*3.2 mm) and a length of an injection-molded specimen of the propylene random copolymer, respectively and then dividing the change relative to the length of the mold cavity by the length of the mold cavity (shrinkage ratio=100*(length of mold cavity−length of injection-molded specimen)/length of mold cavity).

Such a low shrinkage ratio may be achieved by controlling the molecular weight distribution, the crystal size and distribution, thereby exhibiting very excellent properties during production of articles for thin wall injection molding.

Further, the propylene random copolymer according to one embodiment of the present invention may have flexural modulus of 13,000 $kg/cm^2$ or more, as measured in accordance with ASTM D790 method. More specifically, the flexural modulus of the polyolefin resin according to one embodiment of the present invention may be 13,000 $kg/cm^2$ or more, or 13,100 $kg/cm^2$ or more, or 13,200 $kg/cm^2$ or more, or 13,400 $kg/cm^2$ or more and 15,000 $kg/cm^2$ or less, or 14,500 $kg/cm^2$ or less, or 14,000 $kg/cm^2$ or less, or 13,900 $kg/cm^2$ or less.

Further, the propylene random copolymer according to one embodiment of the present invention may have tensile strength at yield of 290 $kg/cm^2$ or more, as measured in accordance with ASTM D638 method. More specifically, the tensile strength at yield of the propylene random copolymer according to one embodiment of the present invention may be 290 $kg/cm^2$ or more, or 292 $kg/cm^2$ or more, or 293 $kg/cm^2$ or more and 320 $kg/cm^2$ or less, or 310 $kg/cm^2$ or less, or 305 $kg/cm^2$ or less, or 300 $kg/cm^2$ or less.

Further, the propylene random copolymer according to one embodiment of the present invention may have Izod impact of 3.5 $kJ/m^2$ or more, as measured in accordance with ASTM D256 method. More specifically, the Izod impact of the propylene random copolymer according to one embodiment of the present invention may be 3.5 $kJ/m^2$ or more, or 3.55 $kJ/m^2$ or more, or 3.6 $kJ/m^2$ or more and 4.0 $kJ/m^2$ or less, or 3.9 $kJ/m^2$ or less, or 3.8 $kJ/m^2$ or less, or 3.7 $kJ/m^2$ or less.

More specifically, the Izod impact may be determined according to ASTM D256 method by fixing the injection-molded specimen having a V-shaped notch in an Izod impact tester, breaking the notched surface by the impact of a pendulum (0.461 kgf), and measuring the energy required for breaking as the impact strength.

Further, the propylene random copolymer according to one embodiment of the present invention may have a melting point (Tm) of 140° C. or more, or 141° C. or more, or 142° C. or more and 150° C. or less, or 148° C. or less, or 145° C. or less. When the propylene random copolymer has the melting point within the above range, it may exhibit excellent processability and heat resistance.

Meanwhile, in the present invention, the melting point of the propylene random copolymer may be determined by elevating the temperature of the copolymer to 200° C. at a rate of 20° C. per minute, maintaining the same temperature for 3 minutes, and then lowering the temperature of the copolymer to 30° C. at a rate of 10° C. per minute, maintaining the same temperature for 3 minutes, and then elevating the temperature, thereby determining the top of a peak on a DSC (Differential Scanning calorimeter, manufactured by TA Co.) curve as the melting point. The melting point is the result measured in the $2^{nd}$ heating run.

Further, the propylene random copolymer according to one embodiment of the present invention may have a melt index ($MFR_{2.16}$) of about 10 g/10 min or more, or about 20 g/10 min or more, or about 30 g/10 min, or about 40 g/10 min or more and about 100 g/10 min or less, or about 90 g/10 min or less, or about 80 g/10 min or less, or about 70 g/10 min or less, as measured at 230° C. under a load of 2.16 kg in accordance with ASTM D1238. The range of the melt index may be appropriately controlled by considering the use or application field of the copolymer.

As described, the propylene random copolymer of the present invention may exhibit remarkably improved shrinkage ratio, tensile strength at yield, flexural strength, and flexural modulus, as compared with polypropylene to which the existing Ziegler-Natta catalyst is applied, or polypropylene to which the existing metallocene catalyst is applied.

The propylene random copolymer having the above-described physical properties and constructive features according to one embodiment of the present invention may be prepared by a preparation method including the step of performing random copolymerization of a propylene monomer and a comonomer in the presence of a catalyst composition including a metallocene compound of the following Chemical Formula 1 as a catalyst active ingredient:

[Chemical Formula 1]

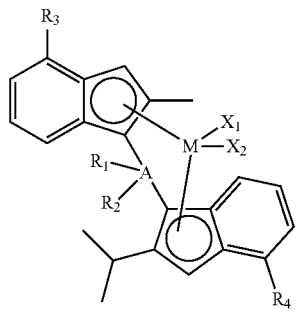

in Chemical Formula 1,

M is a Group 4 transition metal, $X_1$ and $X_2$ are each independently the same or different halogen, A is silicon or germanium, $R_1$ to $R_2$ are, each independently the same as or different from each other, a $C_{1-20}$ alkyl group or a $C_{6-20}$ aryl group, and $R_3$ to $R_4$ are, each independently the same as or different from each other, a $C_{6-20}$ aryl group substituted with a $C_{2-20}$ alkoxyalkyl group.

Meanwhile, unless otherwise specified herein, the following terms may be defined as follows.

The halogen may be fluorine (F), chlorine (Cl), bromine (Br), or iodine (I).

The $C_{1-20}$ alkyl group may be a linear, branched, or cyclic alkyl group, and more preferably, a linear or branched alkyl group. Specifically, the $C_{1-20}$ alkyl group may be a $C_{1-15}$ linear alkyl group; a $C_{1-10}$ linear alkyl group; a $C_{1-5}$ linear alkyl group; a $C_{3-20}$ branched or cyclic alkyl group; a $C_{3-15}$ branched or cyclic alkyl group; or a $C_{3-10}$ branched or cyclic alkyl group. More specifically, the $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, etc.

The $C_{6-20}$ aryl group means a monocyclic, bicyclic, or tricyclic aromatic hydrocarbon. Specifically, the $C_{6-20}$ aryl group may be a phenyl group, a naphthyl group, an anthracenyl group, etc.

The $C_{2-20}$ alkoxyalkyl group means a substituent by substitution of one or more hydrogens of an alkyl group with an alkoxy group. Specifically, the $C_{2-20}$ alkoxyalkyl group may include methoxymethyl, ethoxymethyl, methoxyethyl, ethoxyethyl, butoxymethyl, butoxyethyl, butoxypropyl, butoxybutyl, butoxyheptyl, butoxyhexyl, etc., but the present invention is not limited thereto.

The catalyst composition used in the preparation of the propylene random copolymer according to one embodiment of the present invention includes the compound of Chemical Formula 1 as a single metallocene catalyst. Therefore, the propylene random copolymer prepared thereby may have a remarkably narrow molecular weight distribution, as compared with propylene copolymers prepared by using two or more catalysts in combination, and as a result, it is confirmed that stiffness of the propylene random copolymer is improved.

In Chemical Formula 1, A may be silicon.

Further, $R_1$ and $R_2$ in Chemical Formula 1 may be the same as each other in terms of improving the supporting efficiency by increasing solubility, and may be a $C_{1-10}$ alkyl group, more specifically, a $C_{1-6}$ linear or branched alkyl group, a $C_{1-4}$ linear or branched alkyl group, and much more specifically methyl, ethyl, n-butyl, or tert-butyl. Since the metallocene compound represented by Chemical Formula 1 includes two indenyl derivatives, in which the two indenyl derivatives are connected via a bridge group, it may structurally have high stability and may exhibit high polymerization activity even when supported on a carrier.

Further, since a functional group capable of serving as a Lewis base as an oxygen-donor is included at the $5^{th}$ carbon position of each indenyl derivative and substituents ($R_3$, $R_4$) having bulky property are substituted, steric hindrance may be provided, thereby imparting the supporting stability during preparation of the supported catalyst.

Therefore, when the metallocene compound represented by Chemical Formula 1 which is supported on the carrier is used as a catalyst for the polymerization of the propylene random copolymer, the catalyst exhibits high activity and excellent morphology, thereby preparing the copolymer with excellent processability and mechanical properties.

Further, an isopropyl group and a methyl group are substituted at position 2 of two indenyl groups as ligands, respectively, which permit to have high hydrogen reactivity, as compared with a catalyst having two indenyl groups which are the same as each other, and thus there is an advantage in that a desired product may be produced under low hydrogen conditions.

Preferably, $R_3$ and $R_4$ are each independently a $C_{6-20}$ aryl group substituted with a $C_{2-20}$ alkoxyalkyl group, and more specifically a phenyl group substituted with a $C_{2-20}$ alkoxyalkyl group. More preferably, $R_3$ and $R_4$ may be a tert-butoxymethyl phenyl group, but are not limited thereto.

Further, the substitution position of the alkoxyalkyl group in the phenyl group may be position 4 corresponding to the para position of the $R_3$ or $R_4$ position bound to the indenyl group.

Further, in Chemical Formula 1, $X_1$ and $X_2$ may be each independently chloro. Representative examples of the compound represented by Chemical Formula 1 may be any one of the following structures:

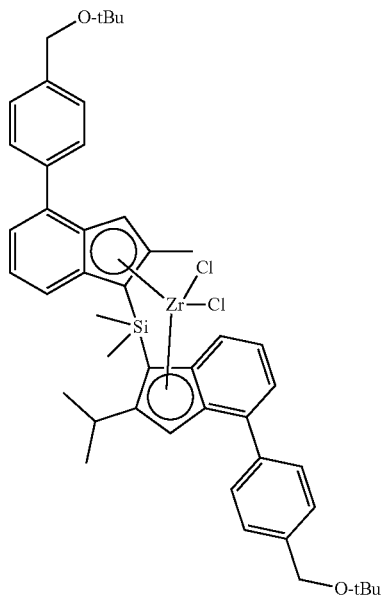

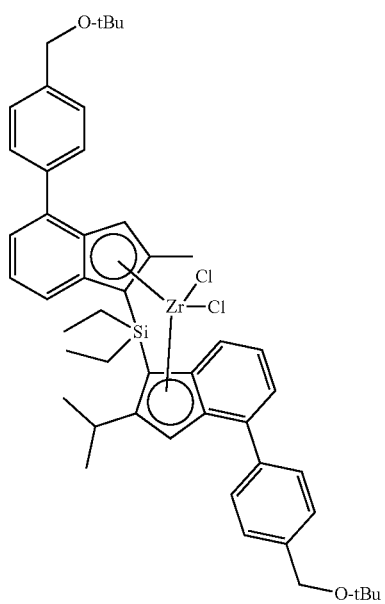

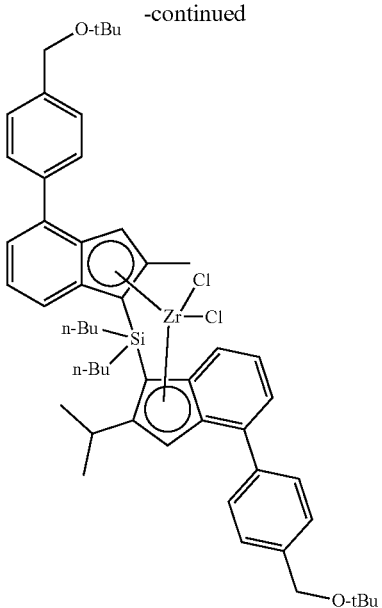

The metallocene compound represented by Chemical Formula 1 may be prepared by a known method of synthesizing an organic compound, which will be described in detail in Examples below.

The metallocene catalyst used in the present invention may be used in the form of a supported metallocene catalyst which is prepared by supporting the metallocene compound represented by Chemical Formula 1 and a cocatalyst compound on a carrier. In the supported metallocene catalyst according to the present invention, the cocatalyst supported on the carrier to activate the metallocene compound is not particularly limited, as long as it is an organometallic compound including Group 13 metal, which is used in the polymerization of olefin in the presence of the general metallocene catalyst.

Specifically, the cocatalyst compound may include one or more of an aluminum-containing first cocatalyst of the following Chemical Formula 3 and a borate-based second cocatalyst of the following Chemical Formula 4.

—[Al($R_7$)—O—]$_k$—  [Chemical Formula 3]

In Chemical Formula 3, $R_7$ is each independently halogen, a halogen-substituted or unsubstituted hydrocarbyl group having 1 to 20 carbon atoms, and k is an integer of 2 or more, $T^+[BG_4]^-$  [Chemical Formula 4]

In Chemical Formula 4, $T^+$ is a monovalent polyatomic ion, B is boron in an oxidation state of +3, and G is each independently selected from the group consisting of a hydride group, a dialkylamido group, a halide group, an alkoxide group, an aryloxide group, a hydrocarbyl group, a halocarbyl group, and a halo-substituted hydrocarbyl group, in which G has 20 or less carbon atoms, provided that G is a halide group at one or less position.

By using the above first and second cocatalysts, the polymerization activity may be further enhanced.

The first cocatalyst of Chemical Formula 3 may be an alkylaluminoxane-based compound, in which repeating units are combined into a linear, circular, or network structure. Specific examples of the first cocatalyst may include methylaluminoxane (MAO), ethylaluminoxane, isobutylaluminoxane, butylaluminoxane, etc.

Further, the second cocatalyst of Chemical Formula 4 may be a borate-based compound in the form of a trisubstituted ammonium salt, a dialkyl ammonium salt, or a trisubstituted phosphonium salt. Specific examples of the second cocatalyst may include a borate-based compound in the form of a trisubstituted ammonium salt such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilium tetraphenylborate, N,N-diethylanilium tetraphenylborate, N,N-dimethyl(2,4,6-trimethylanilium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(secondary-butyl)ammonium tetrakis(pentafluorophenyl)borate, N,N-dimethylanilium tetrakis(pentafluorophenyl)borate, N,N-diethylanilium tetrakis(pentafluorophenyl)borate, N,N-dimethyl(2,4,6-trimethylanilium) tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-,tetrafluorophenyl)borate, dimethyl(t-butyl)ammonium tetrakis(2,3,4,6-tetrafluorophenyl)borate, N,N-dimethylanilium tetrakis(2,3,4,6-tetrafluorophenyl)borate, N,N-diethylanilium tetrakis(2,3,4,6-tetrafluorophenyl)borate, N,N-dimethyl-(2,4,6-trimethylanilium) tetrakis-(2,3,4,6-tetrafluorophenyl)borate, etc.; a borate-based compound in the form of a dialkylammonium salt such as dioctadecylammonium tetrakis(pentafluorophenyl)borate, ditetradecylammonium tetrakis(pentafluorophenyl)borate, dicyclohexylammonium tetrakis(pentafluorophenyl)borate, etc.; a borate-based compound in the form of a trisubstituted phosphonium salt such as triphenylphosphonium tetrakis(pentafluorophenyl)borate, methyldioctadecylphosphonium tetrakis(pentafluorophenyl)borate, tri(2,6-dimethylphenyl)phosphonium tetrakis(pentafluorophenyl)borate, etc.

In the supported metallocene catalyst according to the present invention, a weight ratio of the total transition metals included in the metallocene compound represented by Chemical Formula 1 to the carrier may be 1:10 to 1:1,000. When the carrier and the metallocene compound are included in the above weight ratio, the optimum shape may be achieved. Further, a weight ratio of the cocatalyst compound to the carrier may be 1:1 to 1:100.

In the supported metallocene catalyst according to the present invention, a carrier including a hydroxyl group on its surface may be used as the carrier, and preferably, a carrier including a highly reactive hydroxyl group and siloxane group, of which surface is dried to remove moisture, may be used.

For example, high temperature-dried silica, silica-alumina, or silica-magnesia may be used, and they may usually include oxides, carbonates, sulfates, and nitrates such as $Na_2O$, $K_2CO_3$, $BaSO_4$, $Mg(NO_3)_2$, etc.

A drying temperature of the carrier is preferably 200° C. to 800° C., more preferably at 300° C. to 600° C., and most preferably at 300° C. to 400° C. If the drying temperature of the carrier is lower than 200° C., it retains moisture too much so that moisture on the surface reacts with the cocatalyst. If the drying temperature is higher than 800° C., pores on the surface of the carrier are combined with each other to reduce surface area, and many hydroxyl groups on the surface are lost to remain only siloxane groups. Thus, the reactive sites with the cocatalyst are reduced, which is not preferable.

The amount of hydroxyl group on the surface of the carrier is preferably 0.1 mmol/g to 10 mmol/g, and more preferably 0.5 mmol/g to 5 mmol/g. The amount of hydroxyl group on the surface of the carrier may be controlled depending on the preparation method and conditions of the carrier, or drying conditions, for example, temperature, time, vacuum or spray drying, etc.

If the amount of hydroxyl group is less than 0.1 mmol/g, the reactive sites with the cocatalyst are reduced. If the amount of hydroxyl group is more than 10 mmol/g, it may be caused by moisture besides the hydroxyl groups present on the surface of carrier particles, which is not preferable.

Meanwhile, the propylene random copolymer according to the present invention may be prepared by copolymerizing the monomer and the comonomer in the presence of the above-described metallocene catalyst.

The polymerization reaction may be carried out by copolymerizing propylene monomer and comonomer by contacting with each other using a continuous slurry polymerization reactor, a loop slurry reactor, a gas phase reactor, or a solution reactor.

The polymerization temperature may be about 25° C. to about 500° C., preferably about 25° C. to about 200° C., and more preferably about 50° C. to about 150° C. Further, the polymerization pressure may be about 1 $Kgf/cm^2$ to about 100 $Kgf/cm^2$, preferably about 1 $Kgf/cm^2$ to about 50 $Kgf/cm^2$, and more preferably about 5 $Kgf/cm^2$ to about 30 $Kgf/cm^2$.

The supported metallocene catalyst may be fed after being dissolved or diluted in an aliphatic hydrocarbon solvent having 5 to 12 carbon atoms, for example, pentane, hexane, heptane, nonane, decane, and isomers thereof, an aromatic hydrocarbon solvent such as toluene and benzene, a chlorine-substituted hydrocarbon solvent such as dichloromethane and chlorobenzene, etc. The solvent used herein may be preferably treated with a trace amount of alkyl aluminum to remove catalytic poisons such as water, air, etc. The polymerization may also be performed by further using the cocatalyst.

As described, the propylene random copolymer according to the present invention may be prepared by copolymerizing propylene and comonomer using the above-described supported metallocene catalyst. As a result, the propylene random copolymer may exhibit excellent stiffness due to the narrow molecular weight distribution and the excellent mechanical properties and shrinkage ratio due to the appropriate content of the comonomer. By satisfying the above physical properties, the propylene random copolymer according to the present invention may have excellent processability and injection properties, thereby being preferably applied to articles for thin wall injection molding.

Hereinafter, preferred Examples are provided for better understanding of the present invention. However, the following Examples are only for better understanding, and the content of the present invention is not intended to be limited thereby.

EXAMPLE

Preparation Example of Metallocene Compound

Synthesis Example 1

Preparation of Dimethylsilyl-(4-(4-tert-butoxymethyl)phenyl)-2-methyl-1H-inden-1-yl)(4-(4-tert-butoxymethyl)phenyl)-2-isopropyl-1H-inden-1-yl) zirconium dichloride

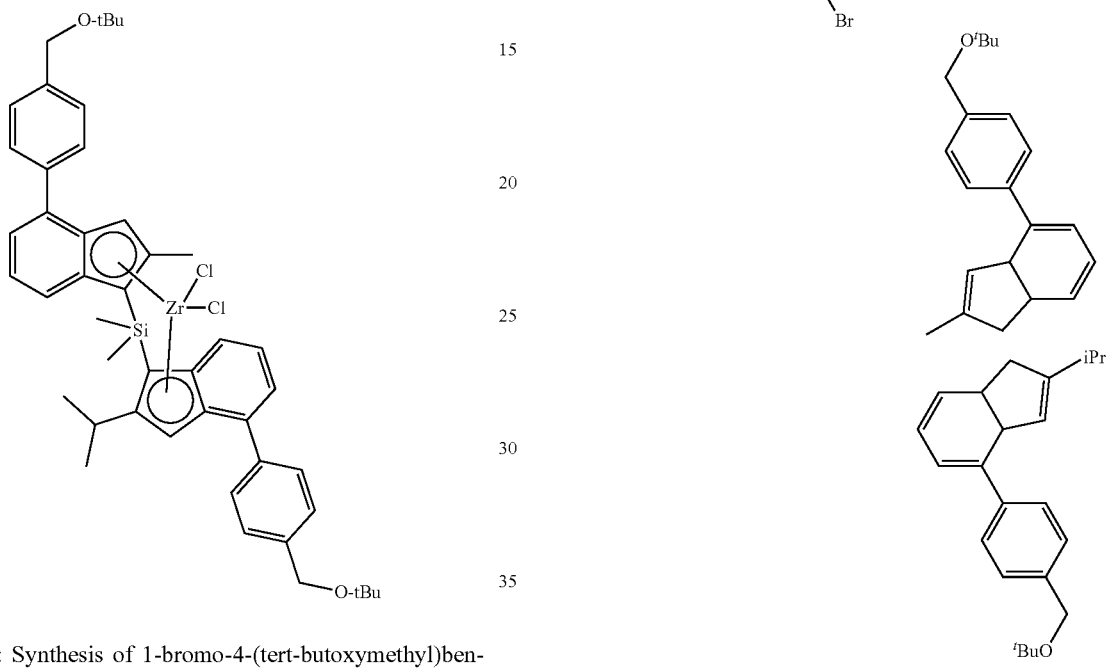

Step 1: Synthesis of 1-bromo-4-(tert-butoxymethyl)benzene

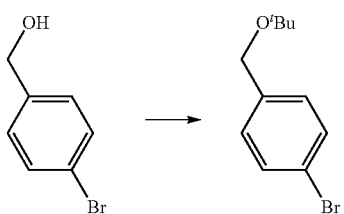 [SMILES: OCc1ccc(Br)cc1 ; CC(C)(C)OCc1ccc(Br)cc1]

$H_2SO_4$ (1.47 mL) and anhydrous $MgSO_4$ (12.9 g, 107 mmol) were added to $CH_2Cl_2$ (80 mL), followed by stirring at room temperature for 15 minutes. This mixture was added to 4-bromobenzyl alcohol (5.0 g, 26.7 mmol) and t-butanol (12.8 mL, 134 mmol) dissolved in $CH_2Cl_2$ (30 mL) in another flask. Thereafter, this mixture was stirred at room temperature overnight, and sat. $NaHCO_3$ was added thereto. Anhydrous $MgSO_4$ was used to remove water, and the resulting solution was concentrated under reduced pressure, and purified by column chromatography (E/H=1/20) to obtain a while solid, 1-bromo-4-(tert-butoxymethyl)benzene (5.9 g, 90%).

$^1$H NMR (500 MHz, $CDCl_3$, 7.24 ppm): 1.28 (9H, s), 4.39 (2H, s), 7.22 (2H, d), 7.44 (2H, d)

Step 2: Synthesis of 7-(4-tert-butoxymethyl)phenyl)-2-methyl-1H-inden and 7-(4-tert-butoxymethyl)phenyl)-2-isopropyl-1H-indene 1-bromo-4-(tert-butoxymethyl)benzene (4.52 g, 18.6 mmol) was dissolved in anhydrous THF (20 mL) under argon (Ar). The temperature was reduced to −78° C., and an n-butyl lithium solution (n-BuLi, 2.5 M in hexane, 8.2 mL) was added and stirred at room temperature for 30 minutes. The temperature was reduced to −78° C. again, and trimethyl borate (6.2 mL, 55.6 mmol) was added and stirred at room temperature overnight. Sat. $NH_4Cl$ was added to the reaction solution, followed by extraction with MTBE. Anhydrous $MgSO_4$ was added, and water was removed by filtration. The solution was concentrated under reduced pressure, and a subsequent reaction was allowed to proceed without additional purification.

The compound obtained above and 7-bromo-2-methyl-1H-indene (3.87 g, 18.6 mmol), $Na_2CO_3$ (5.91 g, 55.8 mmol) were added to a mixed solvent of toluene (40 mL), $H_2O$ (20 mL), and EtOH (20 mL), followed by stirring. $Pd(PPh_3)_4$ (1.07 g. 0.93 mmol) was added to the above solution, followed by stirring at 90° C. overnight. After completion of the reaction, MTBE and water were added and an organic layer was separated. Anhydrous $MgSO_4$ was used to remove water, and the resulting solution was concentrated under reduced pressure and purified by column chromatography (E/H=1/30) to obtain 7-(4-tert-butoxymethyl)phenyl)-2-methyl-1H-indene (2.9 g, 53%).

$^1$H NMR (500 MHz, $CDCl_3$, 7.24 ppm): 1.33 (9H, s), 2.14 (3H, s), 3.36 (2H, s), 4.50 (2H, s), 6.53 (1H, s), 7.11-7.45 (7H, m)

7-(4-tert-butoxymethyl)phenyl)-2-isopropyl-1H-indene was obtained in the same synthesis method, except that 7-bromo-2-isopropyl-1H-indene was used instead of 7-bromo-2-methyl-1H-indene.

Step 3: Synthesis of (4-(4-tert-butoxymethyl)phenyl)-2-methyl-1H-inden-1-yl)(4-(4-tert-butoxymethyl)phenyl)-2-isopropyl-1H-inden-1-yl)dimethylsilane

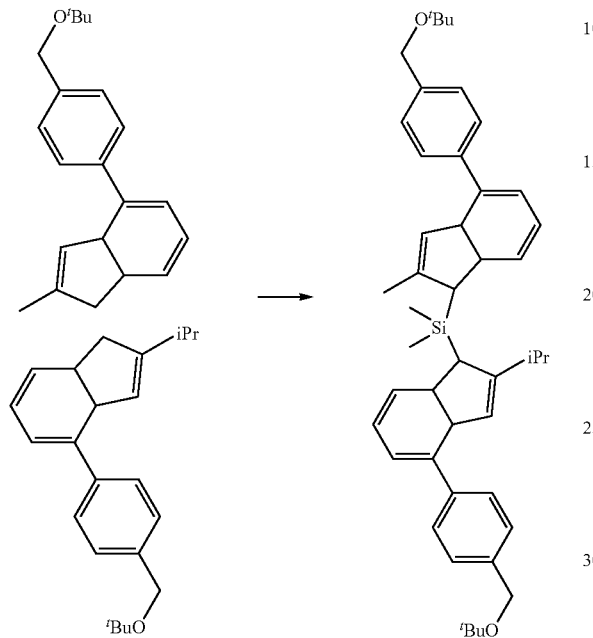

7-(4-tert-butoxymethyl)phenyl)-2-methyl-1H-indene (2.88 g, 9.85 mmol) was dissolved in toluene (18 mL) and THF (2 mL) under argon (Ar). This solution was cooled to −30° C., and n-BuLi (2.5 M in hexane, 4.1 mL) was slowly added. Stirring was performed at this temperature for about 20 minutes, and then the temperature was raised to room temperature, followed by stirring for 2.5 hours.

To this solution, dichlorodimethysilane (1.18 mL, 9.78 mmol) was added, followed by stirring at room temperature for 2.5 hours (reaction solution A).

In another reactor, 7-(4-tert-butoxymethyl)phenyl)-2-isopropyl-1H-indene (3.18 g, 9.85 mmol) was dissolved in toluene (18 mL) and THF (2 mL) under argon (Ar). This solution was cooled to −30° C., and n-BuLi (2.5 M in hexane, 4.1 mL) was slowly added. Stirring was performed at this temperature for about 20 minutes, and the temperature was raised to room temperature, followed by stirring for 2.5 hours (reaction solution B). To reaction solution A, CuCN (44 mg, 0.49 mmol) was added under argon (Ar), followed by stirring for 30 minutes. The reaction solution B was cooled to −20° C., and subsequently added thereto. Stirring was performed at room temperature for 12 hours, and MTBE and water were added and an organic layer was separated. The resulting organic layer was concentrated by removing water with anhydrous MgSO$_4$, and purified by column chromatography (hexane) to obtain a while solid, (4-(4-tert-butoxymethyl)phenyl)-2-methyl-1H-inden-1-yl)(4-(4-tert-butoxymethyl)phenyl)-2-isopropyl-1H-inden-1-yl)dimethylsilane (4.5 g).

Step 4: Synthesis of Dimethylsilyl-(4-(4-tert-butoxymethyl)phenyl)-2-methyl-1H-inden-1-yl)(4-(4-tert-butoxymethyl)phenyl)-2-isopropyl-1H-inden-1-yl) zirconium dichloride

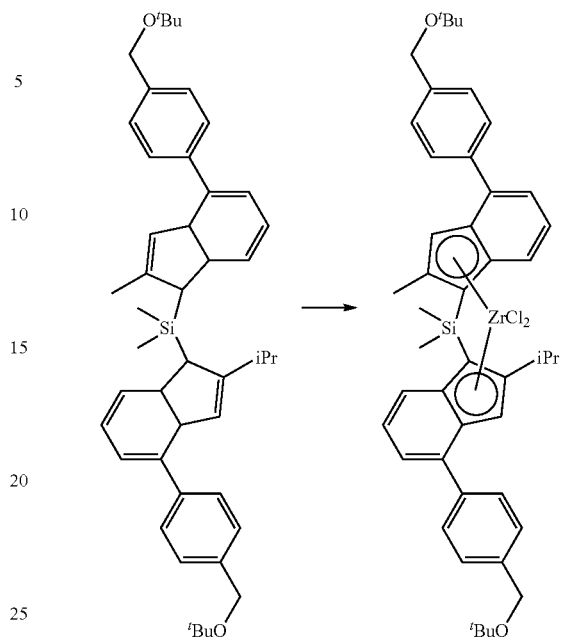

(4-(4-tert-butoxymethyl)phenyl)-2-methyl-1H-inden-1-yl)(4-(4-tert-butoxymethyl)phenyl)-2-isopropyl-1H-inden-1-yl)dimethylsilane(2.1 g, 3.12 mmol) was put in a 50 mL Schlenk flask under argon (Ar), and diethyl ether (20 mL) was added and dissolved. The temperature was reduced to −78° C., and n-BuLi (2.5 M in hexane, 2.7 mL) was added, followed by stirring at room temperature for 2 hours. The solvent was distilled under vacuum, and ZrCl$_4$(THF)$_2$ (1.18 g, 3.12 mmol) was put in a glove box, and the temperature was reduced to −78° C. To this mixture, diethyl ether (20 mL) was added, and then the temperature was raised to room temperature, followed by stirring overnight. The solvent was distilled under reduced pressure, and dissolved in CH$_2$Cl$_2$ to remove solids. The solution was concentrated under reduced pressure, and the resulting solid was washed with toluene and CH$_2$Cl$_2$ to obtain a racemic-rich yellow solid, dimethylsilyl-(4-(4-tert-butoxymethyl)phenyl)-2-methyl-1H-inden-1-yl)(4-(4-tert-butoxymethyl)phenyl)-2-isopropyl-1H-inden-1-yl)zirconium dichloride (260 mg, rac:meso=21/1).

Preparation Example of Supported Catalyst

Preparation Example 1

3 g of silica was weighed into a Schlenk flask, and then 52 mmol of methylaluminoxane (MAO) was added and allowed to react at 90° C. for 24 hours. After precipitation, the supernatant was removed and the resultant was washed with toluene twice. 240 μmol of the metallocene compound of Synthesis Example 1 was dissolved in toluene, and allowed to react at 70° C. for 5 hours. After completion of the reaction and precipitation, the supernatant liquid was removed and the resulting reaction product was washed with toluene, and further washed with hexane, dried under vacuum to obtain 5 g of a silica supported metallocene catalyst in the form of solid particles.

Polymerization Example of Propylene Random Copolymer

Example 1

A propylene-ethylene copolymer was prepared according to a continuous bulk slurry polymerization process by controlling the content of propylene, the content of ethylene, polymerization conditions, etc.

In detail, a 2 L stainless reactor was dried under vacuum at about 65° C., and cooled, and then triethylaluminum (1 M, 3 ml), 400 ppm of hydrogen, 15 g of ethylene, and 770 g of propylene were sequentially fed at room temperature. Thereafter, stirring was performed for about 10 minutes, and 0.048 g of silica supported metallocene catalyst prepared in Preparation Example 1 was dissolved in about 20 mL of trimethylaluminum (TMA) in hexane, and fed into the reactor under a nitrogen pressure. Thereafter, the reactor temperature was slowly raised to about 70° C. and polymerization was performed for about 1 hour. After completion of the reaction, unreacted propylene and ethylene were vented and dry-removed.

Example 2

A propylene-butene copolymer was prepared according to a continuous bulk slurry polymerization process by controlling the content of propylene, the content of 1-butene, polymerization conditions, etc.

In detail, a 2 L stainless reactor was dried under vacuum at about 65° C., and cooled, and then triethylaluminum (1 M, 3 ml), 400 ppm of hydrogen, 15 g of 1-butene, and 770 g of propylene were sequentially fed at room temperature. Thereafter, stirring was performed for about 10 minutes, and 0.048 g of silica supported metallocene catalyst prepared in Preparation Example 1 was dissolved in about 20 mL of trimethylaluminum (TMA) in hexane, and fed into the reactor under a nitrogen pressure. Thereafter, the reactor temperature was slowly raised to about 70° C. and polymerization was performed for about 1 hour. After completion of the reaction, unreacted propylene and 1-butene were vented and dry-removed.

Comparative Example 1

Lumicene MR60MC2, which is a metallocene random propylene product commercially available from Total, com., was purchased and employed as Comparative Example 1.

Comparative Example 2

RANPELEN J-560K, which is a Ziegler-Natta random propylene product commercially available from Lotte Chemical, Corp., was purchased and employed as Comparative Example 2.

EXPERIMENTAL EXAMPLE

Evaluation of Physical Properties of Copolymer

The copolymers prepared in Examples and Comparative Examples were evaluated for physical properties by the following method.

(1) Weight average molecular weight (Mw) and molecular weight distribution (MWD, polydispersity index), GPC curve: a weight average molecular weight (Mw) and a number average molecular weight (Mn) of each polymer were determined by gel permeation chromatography (GPC, manufactured by Waters), and a molecular weight distribution (PDI) was calculated by dividing the weight average molecular weight by the number average molecular weight.

In detail, each copolymer sample was tested using Waters PL-GPC220 instrument with PLgel MIX-B column having a length of 300 mm (Polymer Laboratories). A test temperature was 160° C., 1,2,4-trichlorobenzene was used as a solvent, and a flow rate was 1 mL/min. The sample was prepared at a concentration of 10 mg/10 mL, and then 200 µL thereof was fed. A calibration curve obtained with polystyrene standards was used to determine the values of Mw and Mn. 9 kinds of polystyrene standards having a molecular weight of 2,000/10,000/30,000/70,000/200,000/700,000/2,000,000/4,000,000/10,000,000 were used.

(2) Comonomer content

The comonomer content was determined according to American Society for Testing and Materials, ASTM D 5576 by fixing a film or a film-shaped specimen of the propylene random copolymer to a magnetic holder of FT-IR instrument, measuring a height of 4800~3500 $cm^{-1}$ peak reflecting a thickness of the specimen and an area of 790~660 $cm^{-1}$ peak indicating the 1-butene component from IR absorption spectrum, and then substituting the measured values into Calibration Equation obtained by plotting a value obtained by dividing an area of 790~660 $cm^{-1}$ peak by a height of 4800~3500 $cm^{-1}$ peak of a standard sample. Further, the ethylene content was determined by measuring an area of 710~760 $cm^{-1}$ peak indicating the ethylene component.

(3) Shrinkage ratio (%)

The shrinkage ratio was determined according to ASTM D955 method by measuring a length of a mold cavity (12.7*127*3.2 mm) and a length of an injection-molded specimen of the propylene random copolymer, respectively and then dividing the change relative to the length of the mold cavity by the length of the mold cavity.

Shrinkage ratio=100*(length of mold cavity−length of injection-molded specimen)/length of mold cavity (4) Tensile strength at yield ($kg/cm^2$): tensile strength at yield was measured at a rate of 50 mm/min in accordance with ASTM D638 method.

(5) Flexural modulus ($kg/cm^2$): Flexural modulus was measured in accordance with ASTM D790 method.

In accordance with ASTM D790, the specimen was put and fixed on a support, and then strength ($kg/cm^2$) taken by applying a load of 28 mm/min using a loading nose was measured. Flexural modulus indicating stiffness was determined from the initial slope according to the flexural strength.

(6) Melting Point (Tm, ° C.)

The temperature of the propylene random copolymer to be measured was elevated to 200° C. at a rate of 20° C. per min, and then maintained at the same temperature for 3 minutes, and then the temperature was lowered to 30° C. C at a rate of 10° C. per min, and maintained at the same temperature for 3 minutes, and then the temperature was elevated, thereby determining the top of a peak on a DSC (Differential Scanning Calorimeter, manufactured by TA Co.) curve as the melting point. The melting point is the result measured in the $2^{nd}$ heating run.

(7) Melt index ($MFR_{2.16}$): the melt index was measured in accordance with ASTM 1238 at a measurement temperature of 230° C. under a load of 2.16 kg.

(8) Izod impact ($kJ/m^2$)

The Izod impact was determined in accordance with ASTM D256 by fixing the injection-molded specimen having a V-shaped notch in an Izod impact tester, breaking the notched surface by the impact of a pendulum (0.461 kgf), and measuring the energy required for breaking as the impact strength.

The results are shown in Table 1 below.

TABLE 1

| Section | Example 1 | Example 2 | Comparative Example 1 | Comparative Example 2 |
|---|---|---|---|---|
| Kind of comonomer | C2 | C4 | C2 | C2 |
| C4 content (wt %) | — | 4 | — | — |
| C2 content (wt %) | 2 | — | 2 | 5 |
| Tm (° C.) | 143 | 141 | 143 | 148 |
| MWD | 2.2 | 2.1 | 2.4 | 3.7 |
| Tensile Strength (kg/cm$^2$) | 295 | 295 | 283 | 275 |
| Flexural Modulus (kg/cm$^2$) | 13,700 | 13,100 | 12,800 | 11,000 |
| Izod Impact (kJ/m$^2$) | 3.5 | 3.5 | 3.6 | 3.6 |
| Shrinkage ratio (%) | 0.8 | 0.7 | 1.5 | 2.0 |

Referring to Table 1, the propylene random copolymers of Examples 1 and 2 according to the present invention were confirmed to exhibit excellent physical properties including a molecular weight distribution of 2.4 or less, a very low shrinkage ratio of 1.0% or less, high tensile strength at yield, and flexural modulus, etc.

Comparative Examples 1 and 2 which are the commercially available propylene random copolymers were confirmed to have poor shrinkage property of a shrinkage ratio exceeding 1.0% and to have lower flexural modulus than Examples.

The invention claimed is:

1. A propylene random copolymer satisfying the following conditions of 1) to 5):
   1) a molecular weight distribution (Mw/Mn, PDI) of 2.2 or less;
   2) a comonomer content of 10% by weight or less;
   3) a shrinkage ratio of 1.0% or less, as measured in accordance with ASTM D955 method;
   4) a flexural modulus of 13,000 kg/cm$^2$ or more, as measured in accordance with ASTM D790 method; and
   5) a tensile strength at yield of 290 kg/cm$^2$ or more, as measured in accordance with ASTM D638 method.
2. The propylene random copolymer of claim 1, wherein the comonomer is ethylene or 1-butene.
3. The propylene random copolymer of claim 1, which has an Izod impact of 3.5 kJ/m$^2$ or more, as measured in accordance with ASTM D256 method.
4. The propylene random copolymer of claim 1, which has a melting point (Tm) of 140° C. to 150° C.
5. The propylene random copolymer of claim 1, which has a melt index (MFR$_{2.16}$) of 10 g/10 min to 100 g/10 min, as measured in accordance with ASTM D1238 at 230° C. under a load of 2.16 kg.
6. The propylene random copolymer of claim 1, wherein the molecular weight distribution is 1.5 to 2.2.
7. The propylene random copolymer of claim 1, wherein the flexural modulus is 13,000 kg/cm$^2$ to 15,000 kg/cm$^2$, as measured in accordance with ASTM D790 method.
8. The propylene random copolymer of claim 1, wherein the tensile strength at yield is 290 kg/cm$^2$ to 310 kg/cm$^2$, as measured in accordance with ASTM D638 method.
9. The propylene random copolymer of claim 1, wherein the propylene random copolymer is prepared by copolymerizing a propylene monomer and a comonomer in the presence of a catalyst composition including a metallocene compound of the following Chemical Formula 1:

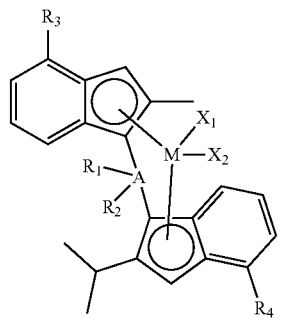

in Chemical Formula 1,

M is a Group 4 transition metal, $X_1$ and $X_2$ are the same or different from each other, and each independently halogen, A is silicon or germanium, $R_1$ to $R_2$ are the same as or different from each other, and each independently a $C_{1-20}$ alkyl group or a $C_{6-20}$ aryl group, and $R_3$ to $R_4$ are the same as or different from each other, and each independently a $C_{6-20}$ aryl group substituted with a $C_{2-20}$ alkoxyalkyl group.

10. The propylene random copolymer of claim 9, wherein the metallocene compound represented by Chemical Formula 1 is any one of compounds represented by the following structural formulae:

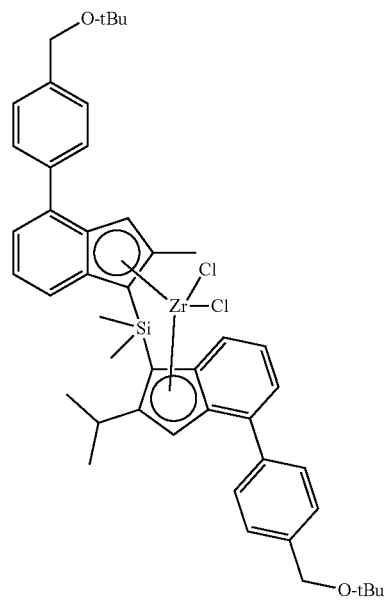

-continued
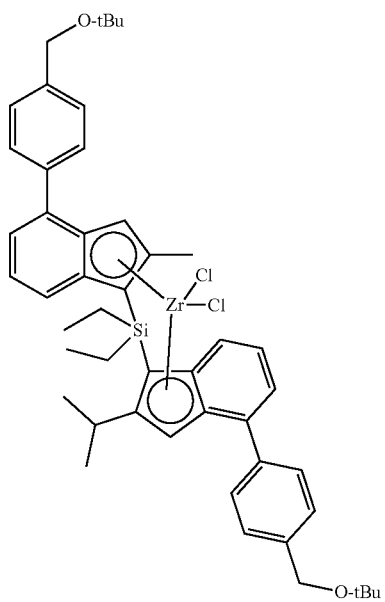
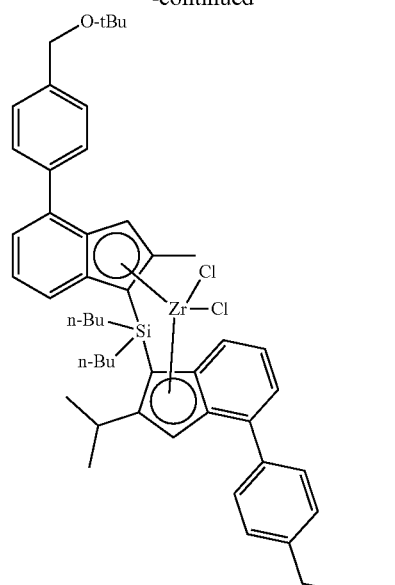
* * * * *